United States Patent [19]

Ziemann

[11] 4,341,201
[45] Jul. 27, 1982

[54] SOLAR ENERGY COLLECTING AND UTILIZATION SYSTEM

[76] Inventor: Ronald W. Ziemann, 4307 Moonbeam Dr., Colorado Springs, Colo. 80916

[21] Appl. No.: 126,141

[22] Filed: Feb. 29, 1980

[51] Int. Cl.³ .............................................. F24J 3/02
[52] U.S. Cl. .................................. 126/422; 126/427; 126/440
[58] Field of Search ................. 126/440, 427; 219/279

[56] References Cited

U.S. PATENT DOCUMENTS

| | | | |
|---|---|---|---|
| 2,509,460 | 5/1950 | Transue | 219/338 |
| 3,934,573 | 1/1976 | Dandini | 126/440 |
| 3,981,295 | 9/1976 | Minnick | 126/419 |
| 4,057,048 | 11/1977 | Maine | 126/440 |
| 4,139,055 | 2/1979 | Thomason et al. | 126/437 |
| 4,205,661 | 6/1980 | Chapman | 126/440 |
| 4,211,212 | 7/1980 | Braun | 126/440 |

FOREIGN PATENT DOCUMENTS 2725630 7/1978 Fed. Rep. of Germany ...... 126/440

Primary Examiner—Carroll B. Dority, Jr.
Attorney, Agent, or Firm—William G. Gapcynski; Werten F. W. Bellamy

[57] ABSTRACT

A solar energy collecting and utilization system is provided which comprises a lens matrix formed by a plurality of lens units disposed in a generally planar array. Each unit comprises a plurality of lenses arranged in a dome-like configuration and having a common focal length. A solar heat collection surface, formed by a thin metallic (e.g. copper) sheet, is shaped to conform to the curve defined by a line drawn through the focal points of the lenses. A viscous liquid (e.g., a vegetable oil) is circulated in contact with the heat collecting foil to extract heat therefrom. A back-up system includes a plurality of infra-red lamps and associated lenses which focus the light from the lamps onto a further heat collecting surface in contact with the circulating, heat extracting liquid.

8 Claims, 5 Drawing Figures 4,341,201

SOLAR ENERGY COLLECTING AND UTILIZATION SYSTEM

FIELD OF THE INVENTION

The invention relates to solar heating systems and, more particularly, to an improved solar energy collection and utilization system.

BACKGROUND OF THE INVENTION

With the increasing awareness of the long term problems which must be solved in view of the finite nature of conventional energy sources such as petroleum, there has been much attention focused on so-called alternative energy sources, such as solar energy. Although many solar heat collecting systems have been developed and substantial improvements have been made, no prior art solar heat collecting system provides the efficiency, cost effectiveness and versatility of the present invention, particularly in the area of home heating use.

A number of solar heat collecting systems use lenses to collect and focus the rays of the sun onto a heat collecting surface. Some examples of such systems are disclosed in U.S. Pat. Nos. 3,981,295 (Minnick); 4,029,077 (Gorniak); 4,057,048 (Maine); 4,134,393 (Stark et al); and 4,136,670 (Davis). The Maine and Davis patents both disclose solar heat collectors utilizing a hemispheric array of lenses, the focal lengths of the lenses being chosen so as to focus the radiant energy from the sun onto a collecting surface such as a shallow tray of water or a collector dish. A number of other solar heat collecting surfaces or bodies have been used including metallic foils (see, for example U.S. Pat. No. 3,129,703 to Tabor). Further, many prior art systems provide for circulating a heating collecting fluid such as water in contact with the heat collecting surface to provide for transfer of the collected heat (see, for example, the Stark et al, Tabor, Minnick and Gorniak patents referred to above). Although the various systems disclosed in these patents possess certain advantages, these systems generally suffer the common disadvantages of the prior art with respect to factors such as efficiency, cost, cost effectiveness and versatility.

SUMMARY OF THE INVENTION

According to the invention, a solar energy collecting and utilization apparatus is provided which substantially reduces or overcomes the problems and shortcomings of prior art systems.

In accordance with a preferred embodiment of the invention, a solar energy collecting and utilization system is provided which comprises a lens matrix formed by a plurality of lens units disposed in a generally planar array, each of the lens units comprising a plurality of lenses, preferably double convex lenses, having a common focal length and being arranged in dome-like configuration; a solar heat collection surface for receiving solar energy focused thereon and shaped to conform to the curve defined by a line drawn through the focal points of the lenses of the plurality of lens units; and means for extracting the radar solar heat collected by the solar heat collection surface.

The solar heat collecting surface preferably comprises one surface of a thin metallic member (foil) and the solar heat extracting means advantageously comprises a heat collecting fluid circulated in contact with the surface of the metallic member opposite to the heat collecting surface. In accordance with an important aspect of the invention, the heating collecting fluid comprises a liquid heat collecting medium selected from the group consisting of lubricating oils, vegetable oils, glycerine, and paraffin oils.

In an advantageous embodiment, the heat collecting surface is supported by a heat reflective support surface, the heat collecting surface being disposed relative to the support surface such that a space is defined therebetween through which the circulating fluid referred to above flows. The metallic member preferably comprises a thin black copper foil and the support surface preferably comprises an aluminum surface.

In accordance with a further important aspect of the invention, the overall system incorporates a back-up system including a further heat collecting fluid, and a infra-red heating arrangement for heating the further heat collecting member. The infra-red heating arrangement comprises a plurality of infra-red lamps and a like plurality of lenses for focusing the infra-red light from the lamps on the further heat collecting surface. Advantageously, the further heat collecting member comprises a thin black copper foil, and the system further comprises a support surface for supporting the copper foil in spaced relationship therewith so that said heat collecting fluid flows in a passage defined therebetween, this passage being inclined to the horizontal so as to enhance flow of the viscous heat collecting fluid.

The system further comprising a storage container for the liquid heating collecting medium and a pump for circulating the medium. The heat extracting means further comprises a fluid heating system such as a forced air or steam heat system that is connected in heat exchange relationship with the heating collecting medium in the storage container. A thermostatically controlled system is advantageously employed for controlling energization of the infra-red lamp in accordance with the sensed temperature of the heat collecting fluid.

The system of the invention provides a number of advantages over the prior art. For example, the use of a plurality of lenses of common or constant focal length is considerably less expensive than the hemispherical array of lenses of varying focal length provided in the Maine and David patents discussed above. As described in more detail hereinafter, the lens arrangement of the invention not only maximizes the socalled "greenhouse" effect commonly used in flat plate collectors by reducing the air space between the lens and collector surfaces but also provides manufacturing and installation advantages.

Other features and advantages of the invention will be set forth in, or apparent from, the detailed description of the preferred embodiments which follows.

DESCRIPTION OF THE PREFERRED EMBODIMENT

Figure 1:
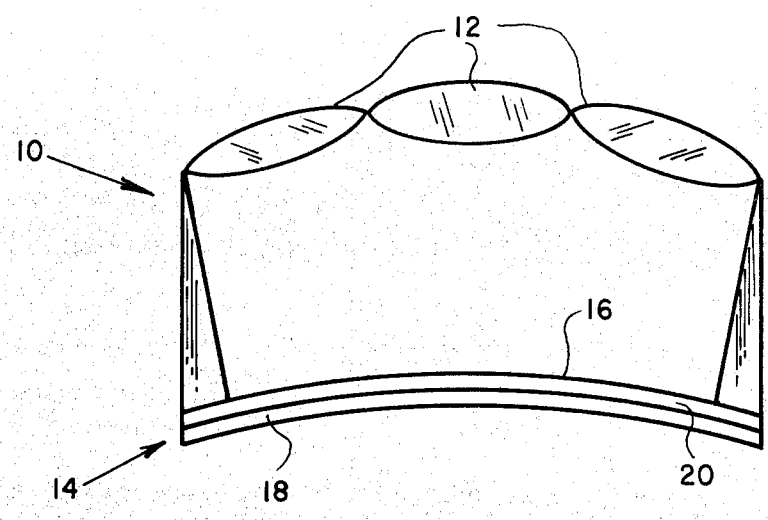
FIG. 1 is a side elevational view of a solar energy collecting unit in accordance with the invention.
Figure 2:
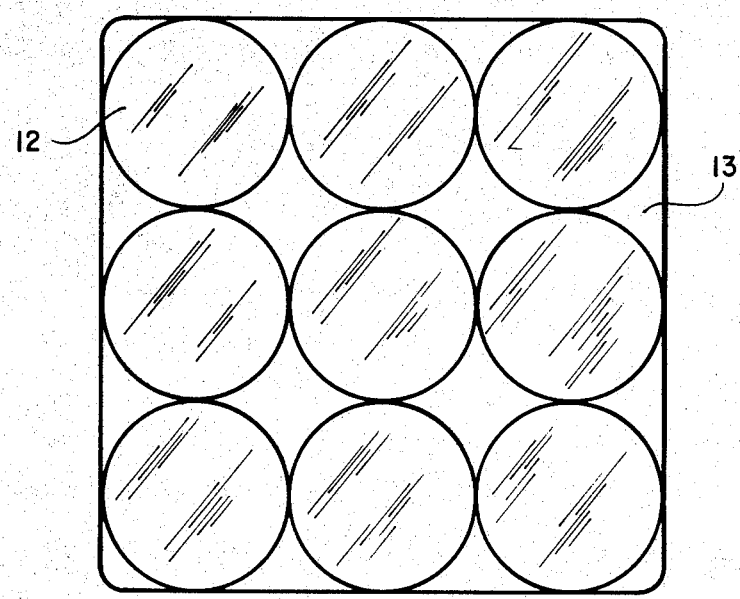
FIG. 2 is a plan view of the solar energy collecting unit of FIG. 1.

Referring to FIGS. 1 and 2, there is illustrated a lens unit which forms a building block in constructing the solar heat collecting system of the invention. The lens unit, which is generally denoted 10, includes a plurality of double convex lenses 12 of constant focal length, supported by suitable means indicated at 13. In the specific embodiment illustrated, each unit comprises nine lenses 12 arranged to form a square as shown in FIG. 2. Each unit 10 also includes a heat collecting surface 14 comprising a very thin black copper foil 16 supported on a reflective aluminum support surface 18. The aluminum support surface 18 provides the necessary support and insulation for a circulating heat collecting medium described below because of the reflective and negative thermal conductive characteristics thereof. The copper foil 16 is located at the focal length of the lenses 12 of lens unit 10. The copper foil 16 is disposed in contact with support surface 18 such that a narrow but definite space 20 is provided therebetween through which the heat collecting medium mentioned above circulates. It will be understood that the showing in FIG. 1 of foil 16, support surface 18 and space 20 is highly schematic and that, for example, foil 16 and space 20 are more narrow in cross section than is shown.

Figure 3:
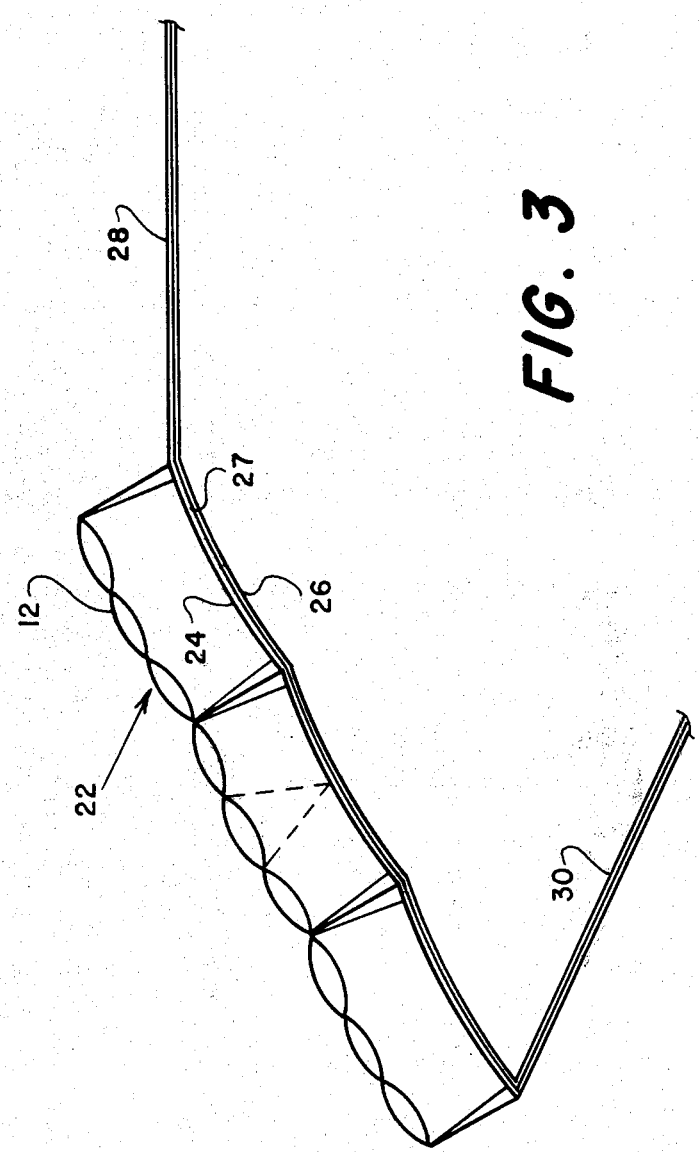
FIG. 3 is a schematic diagram, in side elevation, of a solar heat collector comprising a matrix or array of solar collecting units corresponding to those of FIGS. 1 and 2.

As shown in FIG. 3, the lens units 10 are combined together in a solar heating collector matrix or array 22. The lenses 12 of units 10 are arranged along a hyberbolic curve rather than in a hemisphere as is the case with prior art solar collectors such as discussed above. Further, as illustrated in FIG. 3, a copper foil collecting surface 24, corresponding to individual foil 16, is supported by an aluminum support 26, corresponding to individual support 18, in spaced relationship to lens matrix 22. Collecting surface 24 has the same curvature as the lens matrix 22. The shape of the collecting surface 22 can be seen to follow the curvature that would be outlined by the focal points of the lenses 10 which make up collecting surface 24. This feature not only maximizes the so-called "greenhouse effect" as commonly employed in flat plate collectors by reducing the air space between the inner surfaces of the lenses and the collecting surface but also reduces production costs and on-site design fees.

Although the lenses of the individual units 10 are domelike in shape (and thus the collecting surface 24 presents a waffle-like appearance when viewed in plan), lenses 12 are positioned along a relatively flat curve so that the collecting surface 24 formed thereby is substantially planar in overall cross sectional shape. The planar surface so formed can thus be arranged in an advantageous position relative to the sun depending on geographical location and other factors. On the other hand, the dome shape of the individual units eliminates the need for costly tracking of the sun, since at least one lens of each unit should be focused on the collecting surface at all times of the day during any season, assuming that the lens matrix is properly disposed for the geographical location. It should be understood that it is the shape of the copper foil collecting surface 24 which is conformed to the shape defined by the focal points of lenses 12 and that although the aluminum support 26 is shown as having the same shape, this is not required.

As discussed above in connection with FIGS. 1 and 2, a space, denoted 27, is again defined between the copper foil collecting surface 24 and the aluminum support 26 and this space 27 is connected to suitable conduits, such as formed by copper tubing, for a circulating heat collecting medium. The conduits, denoted 28 and 30, are connected in an overall system which is described below in discussing FIG. 5 and which includes a back-up heating arrangement shown in FIG. 4.

Before considering the overall system in more detail, the circulating medium itself should be discussed. Traditionally, most conventional solar heating units use water as the circulating medium. Although water does, of course, possess a number of advantages, the system of the invention requires a medium having different physical properties from those of water. In particular, the medium must have a high boiling point (150°–350° F.) to accommodate the increased range of temperatures to which the system is to be subjected. In this regard, the concentration of the solar energy provided by the lens matrix results in a foil temperature of between 300° F. and 1000° F. on a sunny day. The medium must also have a higher viscosity and hence a slower flow rate so as to allow for conduction of heat from the copper foil collecting surface to the circulating medium. This higher viscosity also permits the formation of a thin film throughout the space 27 between the collecting surface 24 and the support 26, thereby facilitating rapid and uniform heat transfer with minimum energy loss. Preferably, the medium is one selected from the group consisting of lubricating oils, vegetable oils such as olive oil, glycerine, and paraffin oils. In general, these compositions possess the necessary properties discussed above and at the same time are inexpensive enough to be cost effective.

Figure 4:
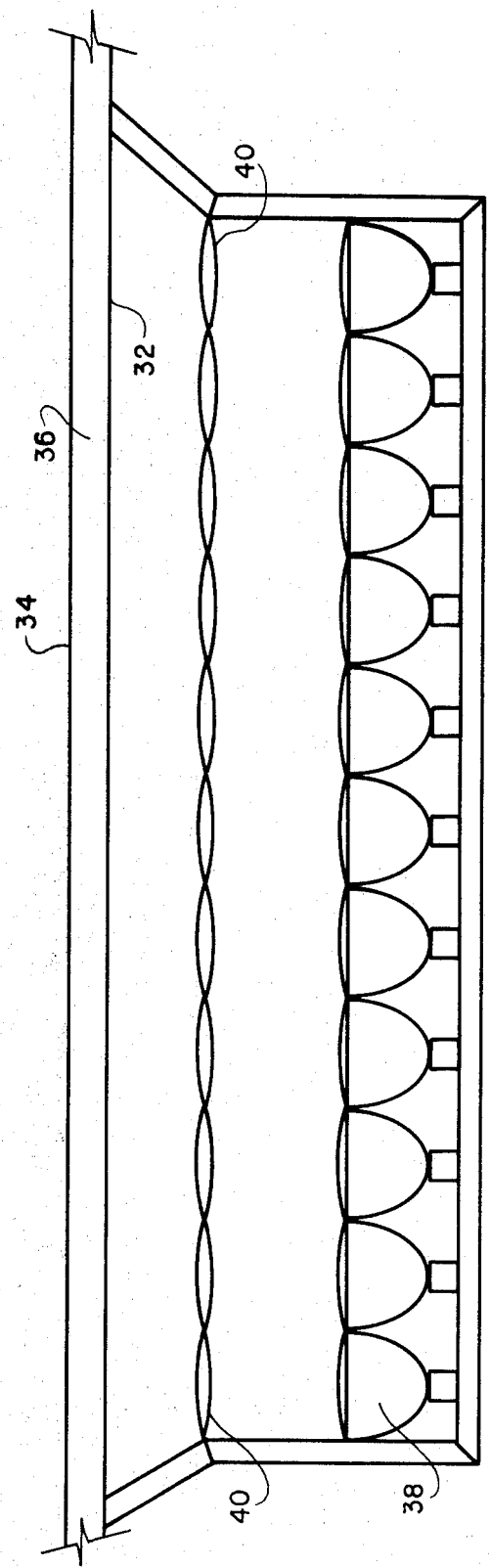
FIG. 4 is a side elevational view of a back-up heating system in accordance with a further aspect of the invention.

Referring to FIG. 4, the back-up arrangement mentioned above is shown in schematic form. It will be understood that in most climates solar heating systems require a back-up heating arrangement of some kind. Most such back-up arrangements utilize traditional heating, such as electric heat, and the necessity for the installation of such an arrangement thus diminishes the value of the solar heating system. Stated differently, such back-up systems are not integrated with the solar heating system and the necessity for two systems generally means that the solar system is not cost effective. This is also true for systems which use the latent heat developed from solar radiation itself. The present invention provides for a back-up system which utilizes the circulating medium which is part of the solar heat collecting system discussed above. As shown in FIG. 4, the back-up arrangement includes a copper foil collecting surface 32 with an aluminum support 34, similar to the heat collector discussed hereinbefore. The heat collector formed by collecting surface 32 and support 34 is generally planar and is disposed so as to be gradually sloping, to thereby permit gravity to aid in the circulation of the viscous heating collecting medium which flows through the space 36 defined between the two surfaces. The arrangement further includes a plurality of serially arranged infra-red lamps 38 which are positioned so that the infra-red light therefrom is directed towards collecting surface 32. A like plurality of lenses 40, individual to each of the lamps 38, are used to focus the infra-red light energy from lamps 38 onto collecting surface 32. It is noted that because of the relatively low resistance of infra-red lamps 38 the energy demands are lower than those of previous systems and the lamps may feasibly be powered by solar cells, thereby decreasing energy costs and increasing the versatility of the system. It will be appreciated that the lenses 38 concentrate the infra-red energy onto the collecting surface thereby multiplying the heat transfer and increasing the effectiveness of the back-up system.

Figure 5:
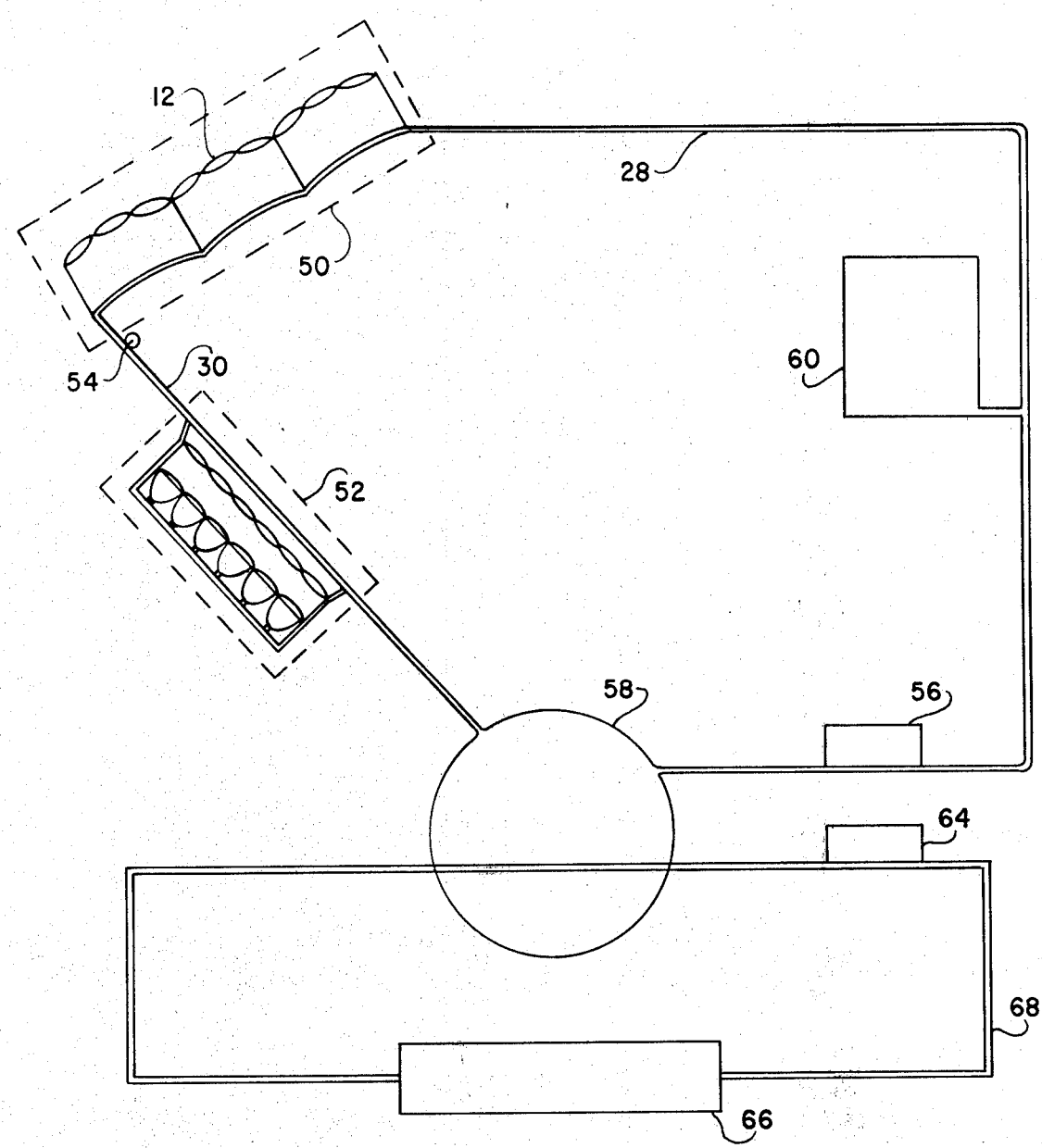
FIG. 5 is a schematic diagram of an overall solar energy home-heating system incorporating the solar heat collector of FIG. 3 and the back-up system of FIG. 4.

Turning now to FIG. 5, which illustrates an overall system incorporating the various aspects of the invention discussed above, the solar collector of FIG. 3 is indicated at 50 and the infra-red back-up system of FIG. 4 is indicated at 52. A thermostatic switch 54 is connected to conduit 30 so as to sense the temperature of the heat collecting medium and to automatically provide switching "on" of the infra-red lamps 38 of back-up system 52 when this temperature falls below a predetermined level. Conduit 28 is connected through a pump 56 to a storage tank 58 for the circulating medium. An expansion tank 60 is also provided as part of the circulating system. The storage container or tank 58 is preferably cylindrical in shape and is as perfectly insulated as possible. Because of the high temperatures referred to above (300° to 1000°), a steel container is practical and cost effective.

The heat from the storage tank is used in a conventional heating system such as a forced air or steam heat system, as indicated schematically in FIG. 5. The system includes a heating grid 64 located in tank 58 in heat exchange relationship with the heat collecting medium stored therein and a pump 64 for circulating the heated fluid to a enclosure (house or other building) indicated at 66 through a suitable conduit 68.

Although the invention has been described in relation to exemplary embodiments thereof, it will be understood by those skilled in the art that variations and modifications can be effected in these exemplary embodiments without departing from the scope and spirit of the invention.

I claim:

1. A solar energy collecting and utilization system comprising a matrix of double convex lenses formed by a plurality of lens units disposed in a generally planar array, each said lens unit comprising a plurality of lenses having a common focal length and being arranged in dome-like configuration; a solar heat collecting surface for receiving solar energy focused thereon comprising one surface of a thin metallic member and shaped to conform to the curve defined by a line drawn through the focal points of the lenses of said plurality of lens units; means for extracting the radiant solar heat comprising a heat collecting fluid circulated in contact with the surface of said metallic member opposite to said heating collecting surface; and a back-up system including a further heat collecting member having one surface in contact with said heat collecting fluid and infra-red heating means for heating said further heat collecting member; said infra-red heating means comprising a plurality of infra-red lamps and a like plurality of lenses for focusing the infra-red light from said lamps on said further heat collecting surface.

2. A system as claimed in claim 1 wherein said heating collecting fluid comprises a liquid heat collecting medium selected from the group consisting of lubricating oils, vegetable oils, glycerine, and paraffin oils.

3. A system as claimed in claim 1 wherein the metallic member containing said heat collecting surface is supported by a heat reflective support surface, said heat collecting surface being disposed relative to said support surface such that a space is defined therebetween through which said circulating fluid flows.

4. A system as claimed in claim 1 wherein said metallic member comprises a thin black copper foil and said support surface comprises a aluminum support surface.

5. A system as claimed in claim 1 wherein said further heat collecting member comprises a thin black copper foil, said system further comprising support means for supporting said copper foil in spaced relationship therewith so that said heat collecting fluid flows in a passage defined therebetween, said heat collecting fluid comprising a viscous liquid and said passage being inclined to the horizontal.

6. A system as claimed in claim 1 wherein said heat collecting fluid comprises a liquid heat collecting medium selected from the group consisting of lubricating oils, vegetable oils, vegetable oils, glycerine and paraffin oils, said system further comprising a storage container for said liquid heat collecting medium and a pump for circulating said medium.

7. A system as claimed in claim 6 further comprising a fluid heating system for a enclosure connected in heat exchange relationship with the heat collecting medium in said storage container.

8. A system as claimed in claim 1 further comprising a thermostatically controlled switch for automatically controlling energization said infra-red lamps in accordance with the sensed temperature of the heat collecting fluid.

* * * * *